United States Patent
Eggert

(10) Patent No.: US 8,604,645 B2
(45) Date of Patent: Dec. 10, 2013

(54) SUPPLY ARRANGEMENT, SUPPLY UNIT AND METHOD FOR SUPPLYING AN ELECTRONIC UNIT

(75) Inventor: Holger Alfons Eggert, Gräfelfing (DE)

(73) Assignee: Enocean GmbH, Oberhaching (DE)

(*) Notice: Subject to any disclaimer, the term of this patent is extended or adjusted under 35 U.S.C. 154(b) by 236 days.

(21) Appl. No.: 12/808,148

(22) PCT Filed: Dec. 21, 2007

(86) PCT No.: PCT/EP2007/064480
§ 371 (c)(1),
(2), (4) Date: Jun. 14, 2010

(87) PCT Pub. No.: WO2009/077011
PCT Pub. Date: Jun. 25, 2009

(65) Prior Publication Data
US 2010/0283328 A1 Nov. 11, 2010

(30) Foreign Application Priority Data
Dec. 14, 2007 (DE) .................. 10 2007 060 201

(51) Int. Cl.
*H02B 1/24* (2006.01)
*G05F 3/16* (2006.01)
*H02J 1/00* (2006.01)

(52) U.S. Cl.
USPC ........... 307/112; 323/223; 323/225; 323/311; 323/314; 323/317; 323/318; 323/325; 323/905

(58) Field of Classification Search
USPC .......... 307/112; 323/223, 225, 311, 314, 317, 323/318, 325, 905
See application file for complete search history.

(56) References Cited

U.S. PATENT DOCUMENTS

| | | | |
|---|---|---|---|
| 4,270,058 A | 5/1981 | Schornack | |
| 5,004,972 A * | 4/1991 | Roth | ............................ 323/320 |
| 5,811,963 A | 9/1998 | Elwell | |
| 6,356,038 B2 | 3/2002 | Bishel | |
| 2006/0158171 A1 | 7/2006 | Downey et al. | |

FOREIGN PATENT DOCUMENTS

FR 2 848 034 6/2004

* cited by examiner

*Primary Examiner* — Hal Kaplan
(74) *Attorney, Agent, or Firm* — Foley & Lardner LLP

(57) ABSTRACT

A supply arrangement, a supply unit and a method in which a switching element is connected in series to an operating voltage and an electrical load, wherein a supply unit supplies an electronic unit with power independently of the switching state of the switching element.

26 Claims, 13 Drawing Sheets

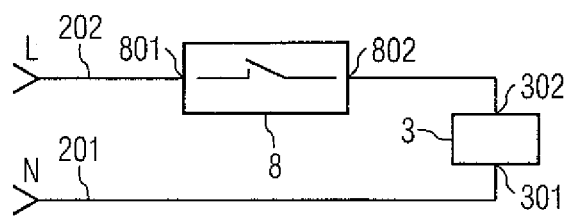
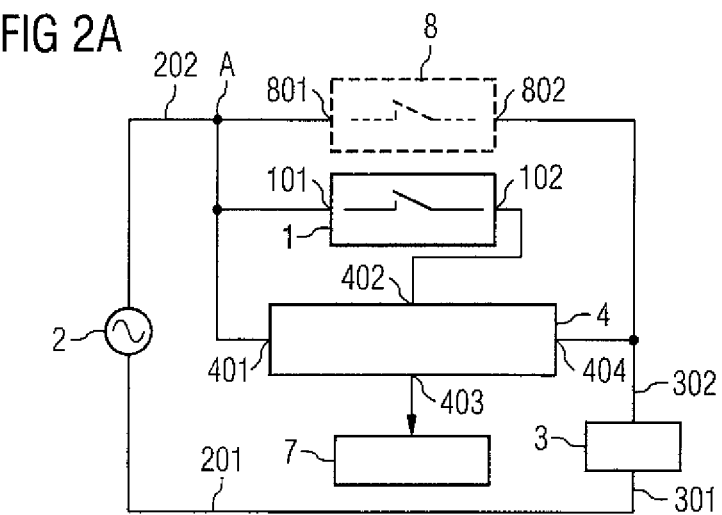
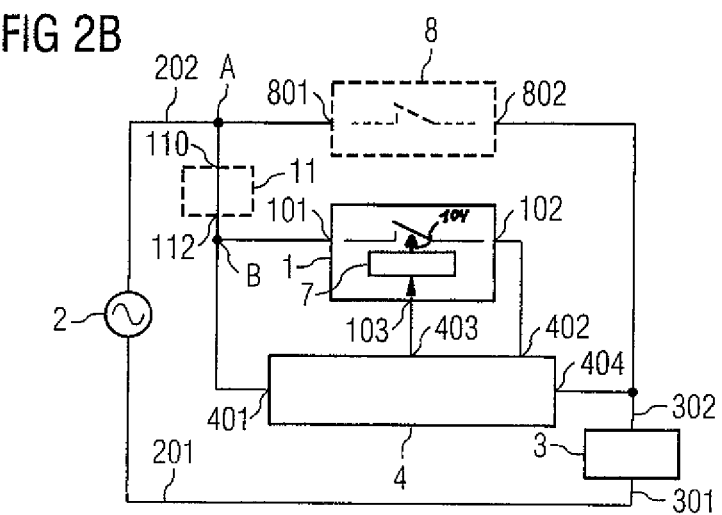

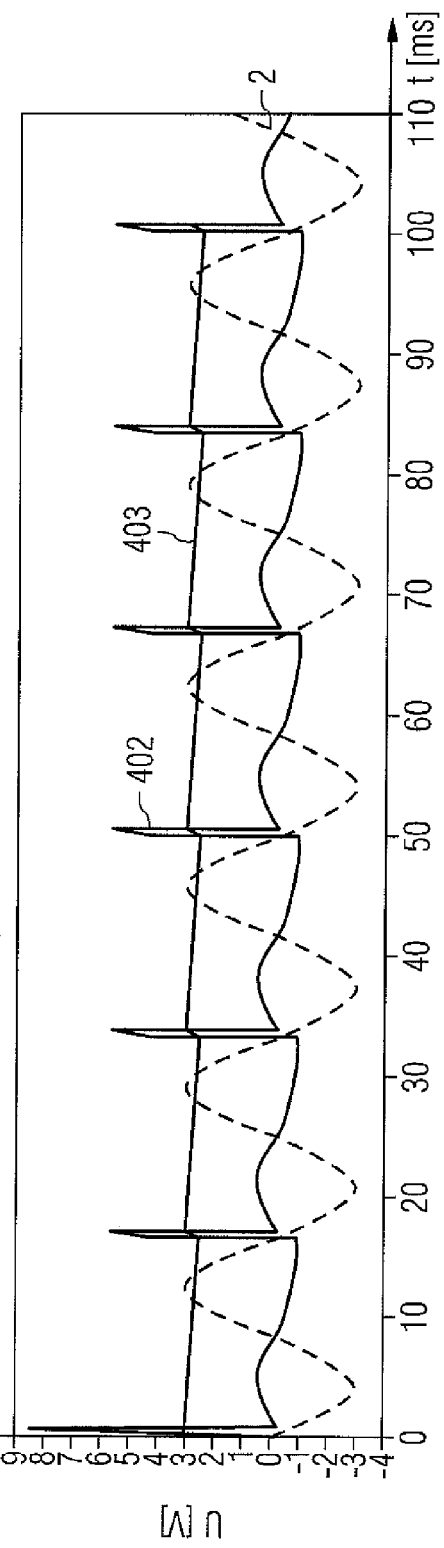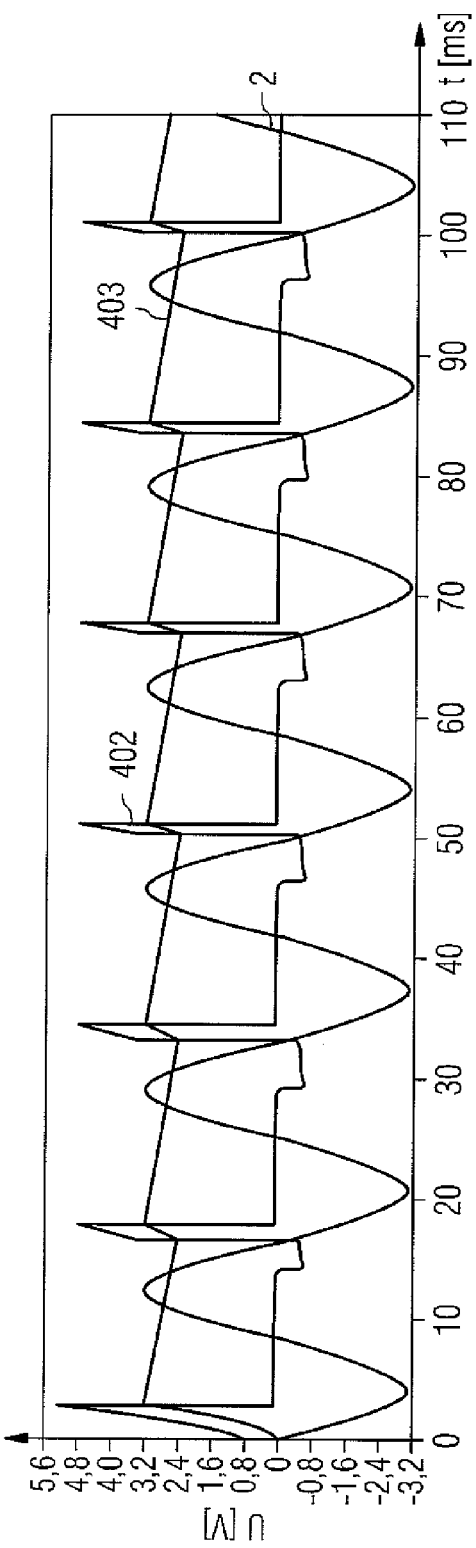

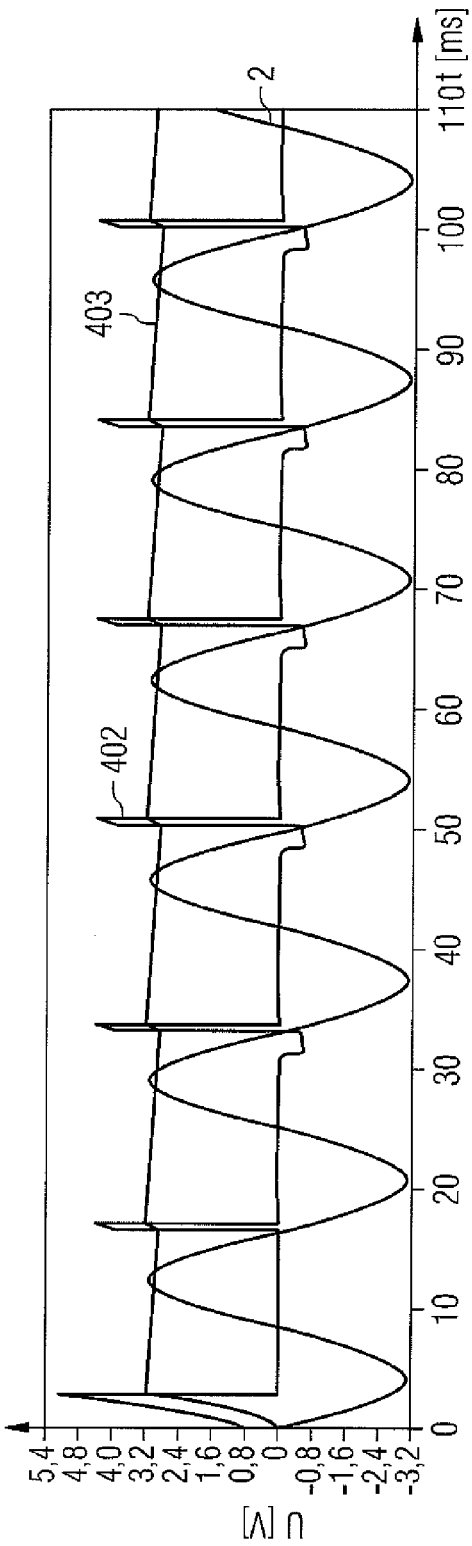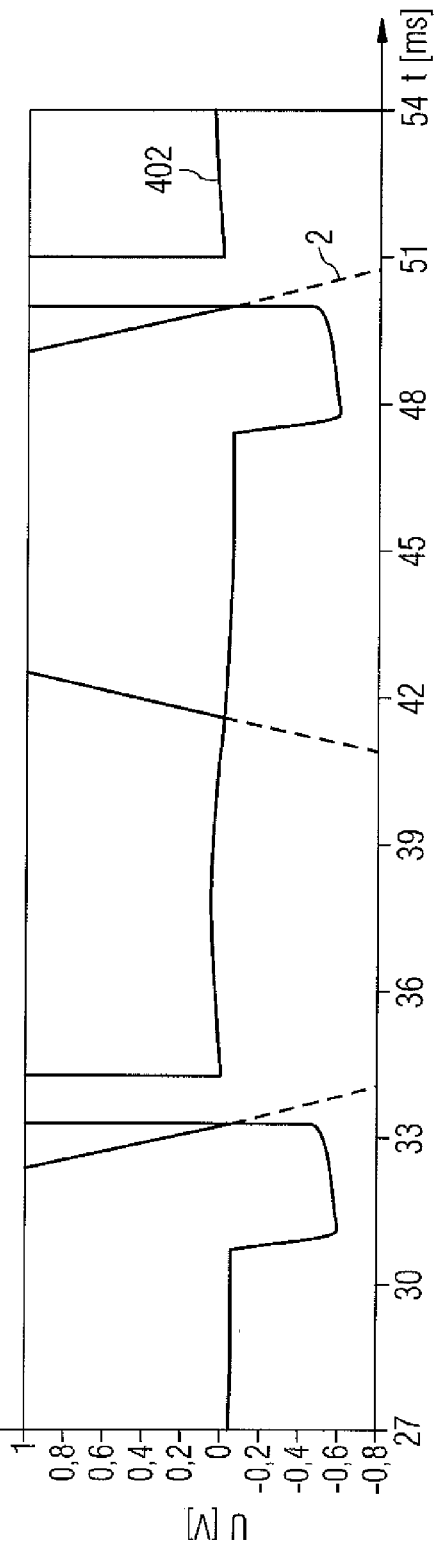

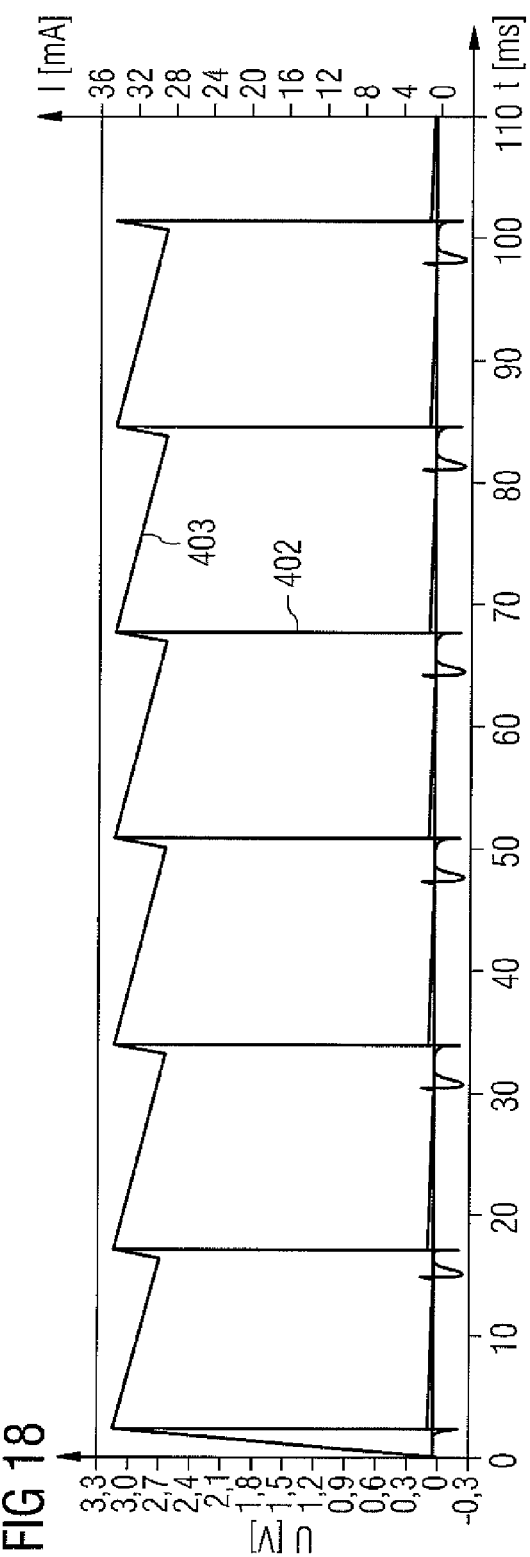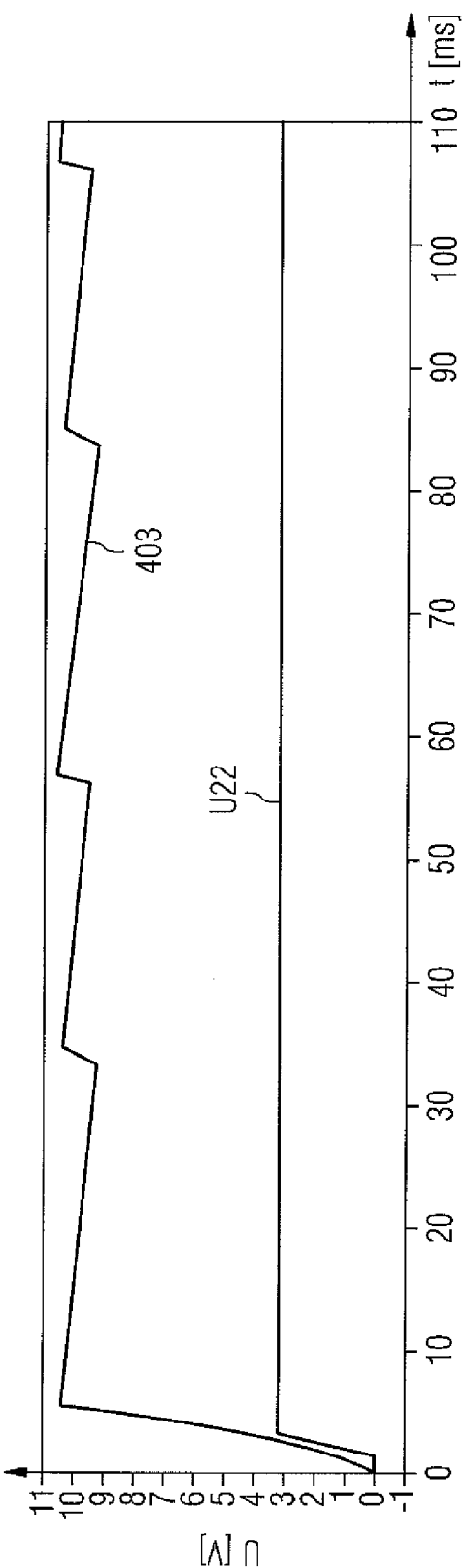

US 8,604,645 B2

SUPPLY ARRANGEMENT, SUPPLY UNIT AND METHOD FOR SUPPLYING AN ELECTRONIC UNIT

RELATED APPLICATION

This is a U.S. National Phase Application under 35 USC §371 of International Application PCT/EP2008/065914 filed on Nov. 20, 2008.

This patent application claims the priority of German Patent Application No. 10 2007 060 201.6 filed Dec. 14, 2007, the disclosure content of which is hereby incorporated by reference.

FIELD OF THE INVENTION

The invention relates to a supply arrangement, a supply unit, as well as a method for supplying an electronic unit, in which an electronic unit is supplied with power independently of the switching state of the switching element.

BACKGROUND OF THE INVENTION

In order to switch electrical loads, an operating voltage with two potentials is applied to a series circuit consisting of a switching element and an electrical load. The electrical switching element, which has at least a first and a second switching state, is conventionally implemented as a mechanical element. Switching states are understood here to mean the "ON" switching state and the "OFF" switching state, the load being electroconductively connected to the operating power potential in the "ON" switching state, and cut off from this operating power potential in the "OFF" state. The "OFF" switching state will be referred to below as the first switching state, I, and the "ON" switching state will be referred to below as the second switching state, II. An operating voltage is understood here as either a DC voltage or an AC voltage. The term operating voltage is largely equivalent in the present invention to the term network voltage. In the European area, a network voltage of 230 V with a 50 Hz sinusoidal alternating voltage is currently provided by the respective network operators.

Switching elements are used for switching electrical loads in building technology, for example. The switching element generally switches only one conductor carrying a voltage or a current. This is predominantly the so-called L-conductor. L stands here for a line or live wire. As shown in FIG. 1, a normally mechanically formed switching element 8 is used here for switching electrical loads 3. The current-carrying conductor L is either connected to the load or cut off from the load.

These days electronic units are being provided more and more commonly. The electronic elements can be integrated into a switch arrangement. Thus, for example, an electronic unit for continuous or stepwise variable supplying of a potential to an electrical load can additionally be integrated into the switching element in order to dim light, for instance. An electronic unit can also be a radio receiver that receives a radio signal or electromagnetic radiation in general for switching the switching element. Corresponding to the radio signal, switching signals are generated by the radio receiver which place the switching element in one state or the other. Additional functions of electronic units in a switching element are likewise conceivable. Moreover, an electronic unit can also contain several units, such as a radio receiver, a dimming or regulating unit and/or a timer circuit. The electronic triggering unit of a relay that drives the mechanical part of the relay will also be considered an electronic unit below.

Electronic units hitherto required a so-called neutral conductor, also called an N-conductor, in order to perform their function. This N conductor serves as a return conductor and as reference potential of the electronic units in a switching element.

If electrical loads are wired with the structure described in FIG. 1, it has hitherto not been possible to supply the electronic units with power. It has also not been possible thus far to supply electronic units outside of the switching element with power independently of the switching state of switching element 8 if only one conductor carrying voltage or current in or out is available. Either switching element 8 is open in accordance with a switching state I, and then there is a potential difference across switching element 8 that could be used, for instance, to provide power to the electronic units. Or if switching element 8 is closed according to a second switching state II, an electrical connection is produced between switch terminals 801, 802 of mechanical switching element 8, and the voltage drop across switching element 8 is zero. A voltage supply element connected in parallel to switching element 8 would thus be bridged and would not supply any power for the electronic units in order, for instance, to put switching element 8 back into the first switching state I.

SUMMARY OF THE INVENTION

One object of the present invention is to provide a supply arrangement, a supply unit and a method for supplying an electronic unit with power, wherein only one conductor carrying a voltage or current in and out and one switching element are available.

This and other objects are attained in accordance with one aspect of the present invention directed to a supply arrangement comprising a switching element having a first and a second switching state; an operating voltage having a first and a second potential, wherein the switching element is connected to a first terminal with the second potential of the operating voltage; an electrical load, wherein the load is connected to a first terminal with the first potential; and a supply unit with the first input connected to the second potential, a second input connected to a terminal of the switching element, an output connected to a second terminal of the load and a supply output connected to an electronic unit, wherein the supply unit supplies the electronic unit with power independently of the respective switching state.

Because the supply unit supplies the electronic unit with power independently of the respective switching state, the electronic unit is continuously supplied with power. Additionally the supply of power to the electronic unit is not interrupted by the changing of the switching state of the switching element. The electronic units can now carry out completely autonomous functions. For instance, an electronic unit can be a sensor element that is continuously supplied with power by the supply arrangement and generates alarm signals, a report signal and/or control signals. If the electronic unit is a motion detector, an infrared sensor for instance, then it is ensured by the continuous supply of power that a motion inside the effective range of the motion detector will be recognized independently of the switching state of the switching element. The term electronic unit here is not limited to a single unit; it can contain several units, for instance, a control circuit, a timer circuit and/or a radio receiver circuit. The electronic units can in part shift the switching element into a different switching state and additionally contain other electronic units.

Because the supply unit has a parallel voltage supply and the parallel voltage supply supplies the electronic unit with power as soon as the switching element is in switching state I, i.e., the switching element is open, it is guaranteed that a voltage supply by the parallel voltage supply unit is enabled. Due to the prevailing first switching state, the potential difference between the two switching element terminals the generation of a supply voltage is enabled.

Because the supply unit further contains a series voltage supply unit, the series voltage supply unit supplies the electronic unit with power as soon as the switching element is in a second switching state II, i.e., the switching element is closed. This series voltage supply unit, which is advantageously situated in series between the switching element and the electrical load, will convert a current flow appearing due to the operation of the active load into a voltage drop. Preferably a shunt resistor, back-to-back connected diodes, a transformer or transistors are provided directly in the current flow, all of these elements converting parts of the current flow into a voltage drop. By means of a linear voltage regulator in particular, the voltage obtained in this manner can be converted into a lower voltage level, so that a smoothed supply voltage for supplying the switching element and the additional units is produced at the output of the linear voltage regulator.

Because diodes additionally decouple the two voltage supply units from only other it is guaranteed that no reverse current or reverse voltage flows from the respectively active voltage supply unit to the respective other voltage supply unit, thereby destroying the other voltage supply unit.

The supply unit produces a supply voltage in an advantageous manner, the supply voltage being defined relative to an autonomous reference potential. This autonomous reference potential is present inside the supply unit and is used only there and in the switching element. Since only one conductor carrying a current or voltage in and out is connected, a supply voltage is generated by this autonomous reference potential independently of the network potential.

The parallel voltage supply unit is advantageously a buck converter, a stepdown converter or a transformer. These are distinguished by a very effective level of efficiency. This level of efficiency is particularly important if a voltage for the supply units is generated in the first switching state I of the switching element, and the electrical load is not to be operated.

This is particularly critical if the active load is a tubular fluorescent lamp or an energy-saving lamp, for instance, which requires a defined ignition current in order to be turned on. If the parallel voltage supply element is not sufficiently effective or efficient, the generated current might be sufficiently high to be able to ignite the load even in the switched off switching state I.

In alternative implementations, the electronic unit is a radio receiver or a dimmer or a control unit. If the electronic unit is a radio receiver, then a radio signal is transmitted to the radio receiver by means of remote control, for instance. The radio receiver generates an appropriate switching signal which causes the switching element to change from the first to the second switching state or vice versa. However, the radio receiver can also generate completely autonomous signals that are detached from the supply arrangement. In another implementation, additional control units are provided in the arrangement. Particularly with dimming switching units as electronic units, which not only have the effect of turning the switching unit on and off, but switch the network potential to the electronic load infinitely variably or stepwise, many switching states of the switching element are achieved.

The switching element can be implemented in various ways. First, it can be a mechanical switch. Equally possible is an implementation as a transistor, a TRIAC, a relay or another known switching element.

Additionally, a so-called service switch can be arranged alongside the switching element preferably driven by electronic switching signals. This service switch is preferably a mechanical element and serves primarily as an additional operating possibility for a user to cut off the conductor carrying current or voltage actively from the electrical load. This service switch is preferably arranged in series between the operating voltage potential L and the supply arrangement. In some applications this service switch is prescribed by law or in order to satisfy a special standard. It also fulfills security aspects.

The electronic unit is advantageously a timer switch. The switching element here is implemented in the form of a key. If the key is operated once, switching state II of the switching element is set. After expiration of a set time span in the timer circuit, switching state I is automatically set in the switching element. Here, as in all other implementations, it is advantageous that only one conductor carrying voltage or current in and out is provided in the arrangement. The parallel voltage supply unit can be dispensed with, if appropriate.

A method with which a supply arrangement as described above is operated is additionally provided. In this case a network voltage potential is applied. This network voltage potential can be a DC voltage or an AC voltage.

The invention is not limited by any ordinary network voltage level or a given type of network voltage. When applied in the motor vehicle field, for instance, where switching elements are likewise used to switch electrical loads, and a DC voltage is available as the supply voltage, such a supply arrangement is likewise conceivable.

BRIEF DESCRIPTION OF THE DRAWINGS

Embodiments of the invention will be described below with reference to the drawings, identically or identically functioning elements in the drawings being labeled with identical reference characters. The illustrated elements should not be viewed as being drawn to scale; rather, individual elements may be shown exaggerated in size or highly simplified.

FIG. 1 shows a conventional switching element arrangement for connecting an electrical load according to prior art, FIG. 2a shows a first embodiment for supplying an electronic unit with power, FIG. 2b shows an alternative embodiment of the supply arrangement shown in FIG. 2a, FIG. 3a shows a refinement of the embodiment shown in FIG. 2a, FIG. 3b shows a refinement of the embodiment shown in FIG. 2b.

DETAILED DESCRIPTION OF THE DRAWINGS

Figure 3A:
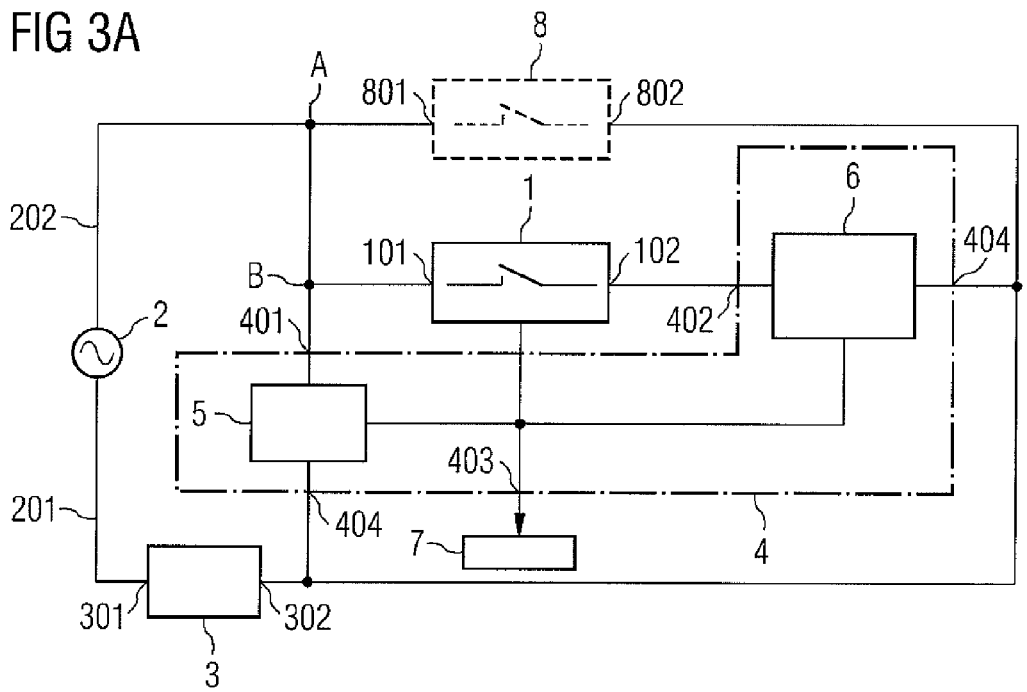

FIG. 1 was already described in the general part of the specification.

In FIG. 2a, an operating potential 2 with a first potential 201, N and a second potential 202, L is applied to a supply arrangement for supplying an electronic unit 7 with power independently of the switching state of a switching element 1. Mechanical switching element 8 is shown here only in broken lines. Mechanical switching element 8 is not provided in the supply arrangement.

Further represented is a supply unit 4 with two inputs 401 and 402, a supply output 403 and an output 404. A switching element 1 is represented with a first terminal 101 and a second terminal 102. An electronic unit 7 is electroconductively connected to supply output 403 of supply unit 4. Second terminal 102 of switching element 1 is electroconductively connected to second input 402 of supply unit 4. First terminal 101 of switching element 1 is electroconductively connected to first input 401 of supply unit 4. An electroconductive connection between second potential 202 of operating potential 2 and first input 401 of supply unit 4, as well as an electroconductive connection of output 404 of supply unit 4 to second terminal 302 of electrical load 3 likewise exist. Electrical load 3 is additionally connected to a first terminal 301 with first potential 201 of operating voltage 2.

The invention is not limited to the form, frequency or level of an operating voltage 2. Operating voltage 2 is preferably a sinusoidal alternating voltage, in particular with the level of a network voltage.

For a functional description of FIG. 2a, first a few general remarks can be made which are valid for the entire description insofar as no other remarks are made at the respective other points.

Mechanical switching element 8 is not provided and does not belong to the supply arrangement. The mechanical switching element should accordingly be replaced or integrated as a switching element 1 into the supply arrangement. Switching element 1 has at least a first and a second switching state I, II. In addition, case 1 is always understood to mean that switching element 1 is in the first switching state and is open, and case 2 is understood to mean that switching element 1 is in the second switching state and is closed.

An electronic unit 7 is understood to be a unit which is to be supplied independently of the switching state of a switching element, with only one conductor carrying a current or voltage in and out. An electronic unit can contain several electronic units. Sensors, control units and/or alarm units can be provided as electronic units. For the entire invention, an electronic unit 7 is fundamentally not limited by its function or its nature. The type of power supply for electronic unit 7 is likewise not limited. Electronic unit 7 can change the switching states I, II of switching element 1.

Electronic unit 7 is supplied with power in case 1 via second potential 202 which is present at first input 401 of supply unit 4. The electronic circuit through electrical load 3 is closed via output 404. Due to the voltage difference between input 401 and output 404 of supply unit 4, a supply signal is made available to electronic unit 7 via supply output 403.

For case 2, the current that flows between second terminal 102 of switching element 1 and electrical load 3 is used in supply unit 4. This current is converted in supply unit 4 into a voltage drop and made available to electronic unit 7 at supply output 403 of supply unit 4.

With this arrangement it is possible to provide a supply voltage continuously to electronic unit 7, independently of case 1 or 2.

An alternative embodiment to the illustrated supply arrangement from FIG. 2a is represented in FIG. 2b. Since both embodiments are extremely similar, only the differences between FIGS. 2a and 2b will be discussed here.

Switching element 1 has an additional supply input 103, which is electroconductively connected to supply output 403 of supply unit 4. Electronic unit 7 is situated inside switching element 1. In particular, switching element 1 is understood to mean a switching element 1 driven by electrical signals and changing switching states I, II by means of electrical signals. The supply of power electronic units 7 via supply unit 4 is provided independently of the switching state of switching element 1.

For instance, electronic unit 7 generates a switching signal 104 with which switching element 1 changes a switching state. This electronic unit 7 is, for instance, a lamp dimmer circuit, control circuits for controlling light or a timer circuit, a radio receiver for remote controlling switching element 1, the electronics of a relay, or any of various things. Switching element 1 can have more than two states, for instance, in which case an electric switching signal 104 sets the different switching states in switching element 1.

Switching element 1 fundamentally merely corresponds to the mechanism of a switching element. A control electronic unit or the like already corresponds to an electronic unit 7. The mechanical switching elements of a bistable relay in the supply arrangement correspond, for instance, to the mechanism of switching element 1. The electrical or electronic triggering as well as the electrical elements in the relay are to be viewed as an electronic unit 7. In this embodiment at least one part of an electronic unit 7 is provided that changes the switching states I, II of the switching element by means of switching signals 104. Other parts of electronic unit 7 can again be implemented as described under FIG. 2a.

All parts of these electronic units 7 can be arbitrarily combined. A combination of several parts of an electronic unit 7 is also referred to in this description as an electronic unit 7.

A service switch 11, shown in broken lines, is optionally additionally inserted. This service switch is connected by a first terminal 110 to a current node A and by a second terminal 111 to a current node B. The electroconductive connection drawn in a solid line between current nodes A and B is omitted if surface switch 11 is included.

Service switch 11 enables an additional possibility for switching electrical load 3. Independently of the switching state I, II of switching element 1, it is possible to cut off second potential 202 of operating voltage 2 at any time by means of service switch 11 which is, in particular, implemented mechanically. In some applications, such a service switch 11 is required for safety reasons or should be provided for reasons of user-friendliness. Service switch 11 can optionally be included in all embodiments.

A refinement of the supply arrangement illustrated in FIG. 2a is shown in FIG. 3a. Only the differences between FIGS. 2a and 3a will be discussed below. Unlike FIG. 2a, supply unit 4 is drawn in broken lines in this and the following figures and represented in more detail. Supply unit 4 is implemented in FIG. 3a with a parallel voltage supply unit 5 and a series voltage supply unit 6.

Figure 5:
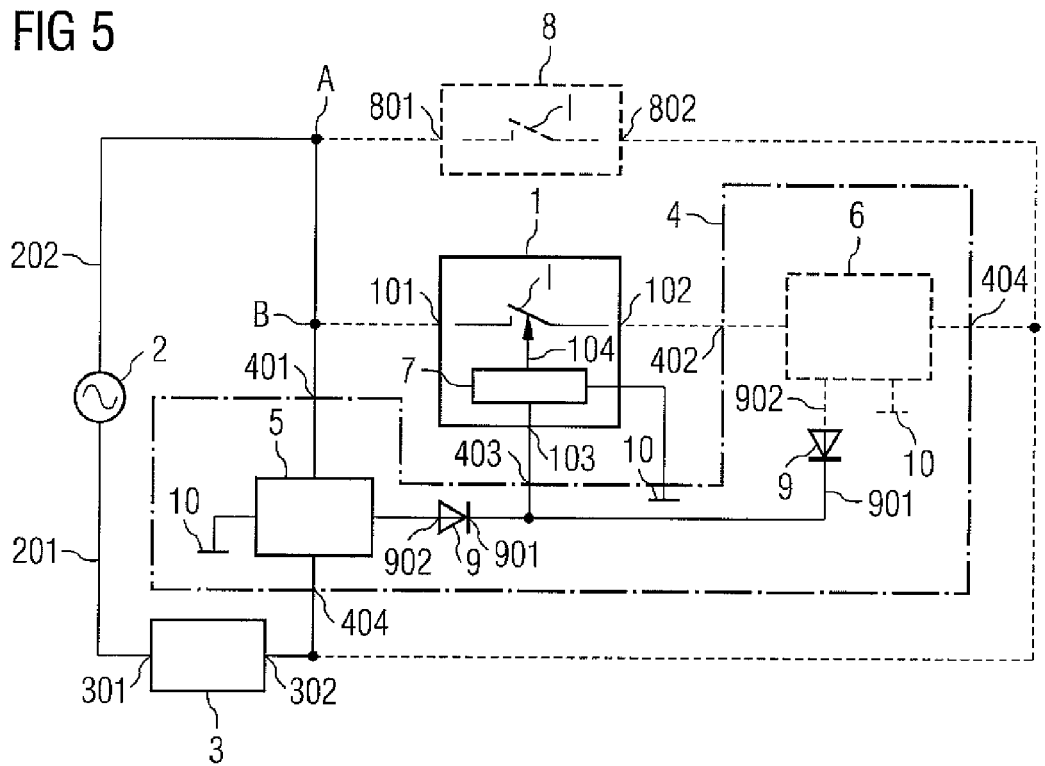
FIG. 5 shows a first operating case I of the embodiment shown in FIG. 4, FIG. 6, a second operating case II of the embodiment shown in FIG. 4.
Figure 6:
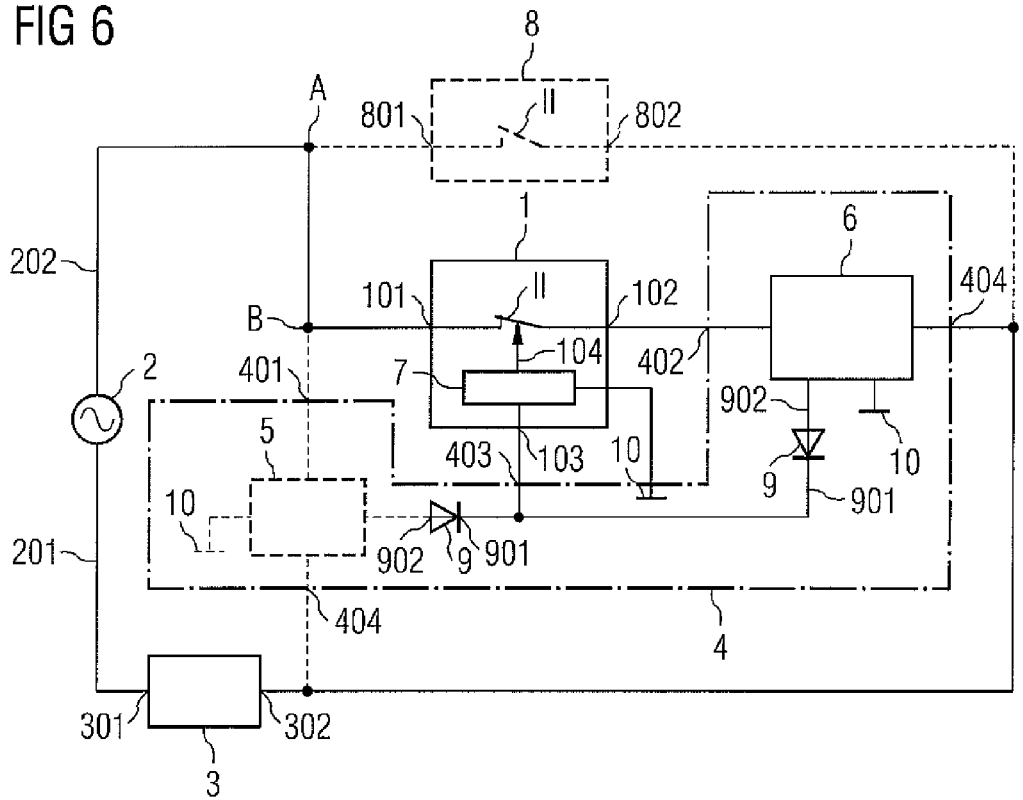

An extensive functional description of FIG. 3a is presented in the description of FIGS. 5 and 6.

Figure 3B:
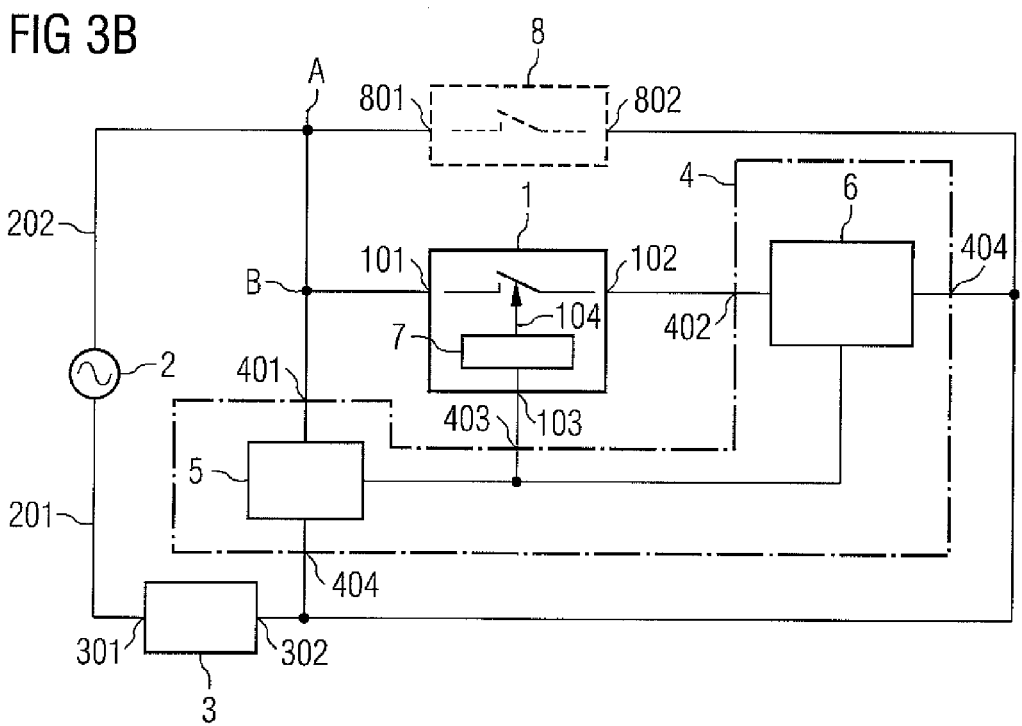

A refinement of the embodiment from FIG. 2b is shown in FIG. 3b. The differences between FIGS. 2b and 3b correspond to the differences between FIGS. 2a and 3a, for which reason a detailed description is omitted at this point.

In the subsequent figures, electronic unit 7 is included as in FIGS. 2b and 3b. Electronic unit 7 preferably has an autonomous reference potential 10. In all subsequent refinements and alternative embodiments, electronic unit 7 can likewise be included as in FIGS. 2a and 3b. A representation in this regard was omitted here.

Figure 4:
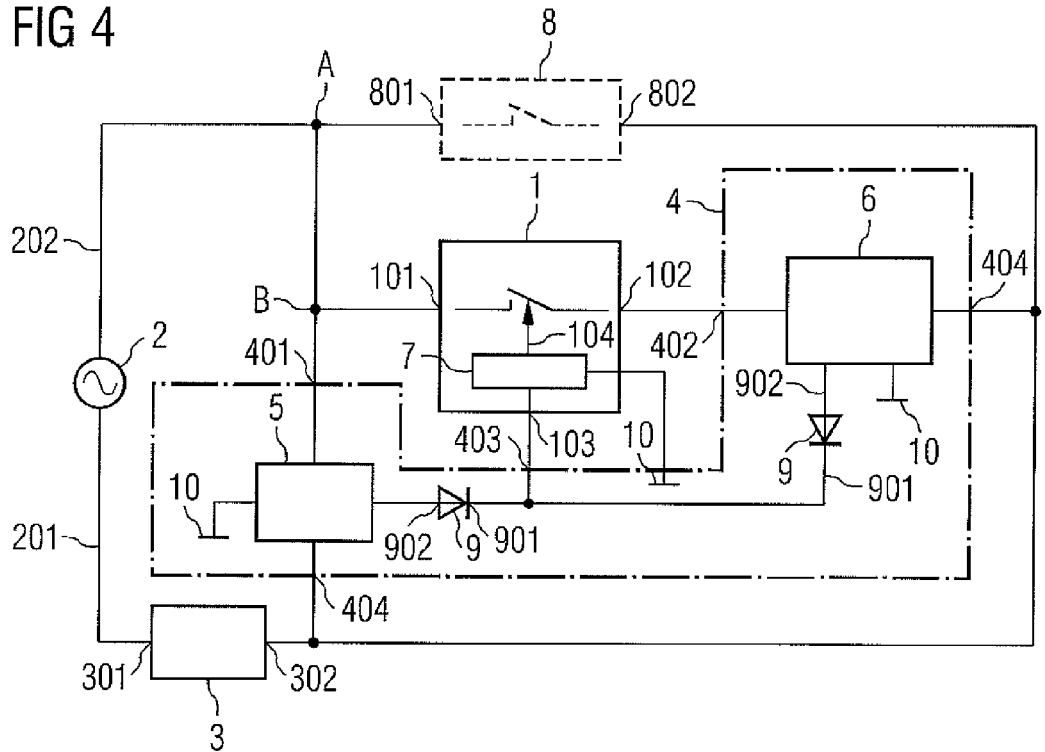
FIG. 4 shows a refinement of the embodiment shown in FIG. 3.

A refinement of the embodiment represented in FIG. 3b for supplying a switching element 1 with power is represented in FIG. 4. Only the differences between FIGS. 3b and 4 will be discussed below. In contrast to FIG. 3b, two diodes 9 are represented. The latter serve to decouple the two voltage supply units 5 and 6, and protect them from reverse current or reverse voltage. The two diodes have a first diode terminal 901, also referred to as a cathode, and a second diode terminal 902, also referred to as an anode. The two anode terminals 902 face the respective voltage unit 5 or 6 that is to be protected.

It is also shown that an autonomous reference potential 10 is generated at voltage supply units 5 and 6 and is available to switching element 1 as well as electronic unit 7. Autonomous is here understood to mean that reference potential 10 is independent with respect to operating voltage 2, and is not relative to this operating voltage 2 or its potentials 201 and 202.

An extensive functional description of FIG. 4 is presented in the description of FIGS. 5 and 6.

The embodiment shown in FIG. 4 is sketched again in FIGS. 5 and 6. In both figures at least two switching states I and II of switching element 1 are represented. Depending on the respective switching state I or II, the part of the supply arrangement active for that state is drawn in solid lines, and the part of the supply arrangement which is inactive with respect to that switching state is drawn in broken lines. A distinction of cases regarding the two switching states I and II will now be performed.

In case I, which is shown in FIG. 5, series voltage supply unit 6 as well as its incoming and outgoing lines 402, 404, 902 and 10 are shown in broken lines. Switching element 1 is opened and is supplied in this case by means of parallel voltage supply unit 5. An optionally integrated service switch 11 must remain closed in order to allow current flow.

Since switching element 1 is open, there is no current flow between the two switching terminals 101 and 102. Since electrical load 3 is not operated, a potential that is different from second potential 202 of operating voltage 2 is initially present at the second terminal 302 of load 3 and correspondingly at output 404 of parallel voltage supply 5. This potential difference between 202 and 302 is used in parallel voltage supply unit 5 to prepare a supply voltage at supply output 403 of supply unit 4.

Especially if loads 3 that are not purely ohmic are used, for instance, an energy-saving lamp or a fluorescent lamp, the parallel voltage supply unit has a very high efficiency. This is achieved especially by a highly efficient power supply/network adapter. Such supply units are, for instance, buck converters, stepdown converters or transformers.

Since energy-saving lamps and fluorescent lights are ignited by an ignition current or an ignition voltage, and thus "turned on," attention must be paid in such applications that the current through load 3 is less than the ignition current, or that the voltage drop across parallel voltage supply unit 5 is high enough that an ignition voltage required across load 3 is not reached, both situations leading to the ignition of load 3. This would correspond to a fault, because load 3 would be driven despite the fact that switching element 1 is turned off.

As an example, one can mention here a so-called hot-start lamp as used and operated in Europe. A glow lamp with an ignition voltage of roughly 80 V in the interior of the starter heats, by means of the current flowing through it, a bimetallic strip, which then interrupts the current flow through the heating coils and generates the ignition pulse via a choke. This current flow through this glow lamp also exists when a parallel voltage unit 5 is used in electrical load 3, and causes a voltage drop both in the parallel voltage unit and in active load 3. If the current through parallel voltage unit 5 is too high, the hot-start lamp will be ignited. If the voltage through the glow lamp is not greater than the ignition voltage, no current flows through the parallel power supply. Parallel voltage supply unit 5 now has a usable range of 230 V−80 V=150 V in the European network. If the same supply arrangement is operated in the USA, parallel voltage supply unit 5 has only a voltage difference of 110 V−80 V=30 V available, whereby substantially higher requirements are placed on the effectiveness of parallel voltage supply unit 5. Since there are also cold start lamps as ultra low cost variants, a lower current through the parallel network part would suffice to ignite a lamp. This case is likewise taken into account in the concept of the invention. It is further desired to keep the current flow in case I always sufficiently low that such a load is not subject to any additional "artificial" aging, and load 3 has a longer service life.

Case II of the case distinction, in which switching element 1 is closed, is illustrated in FIG. 6. Here it must be noted that an optionally inserted service switch 11 continues to be closed. If this is not taken into account, service switch 11 opens the circuit and the supply arrangement cannot be operated.

In case II there is an electroconductive connection between the two terminals 101 and 102 of switching element 1. The parallel power supply is deactivated here and series voltage supply unit 6 is activated. The current flow between input 402 and output 404 is used in series voltage supply unit 6 and converted into a voltage drop. In particular, a series element is used for this purpose. This series element, also referred to as a shunt, can be implemented in various ways. The reader is referred here to subsequent figures in which series voltage supply unit 6 is described in detail. Series supply voltage unit 6 now supplies the converted voltage drop as the supply voltage to supply input 103 of switching element 1 via supply output 403.

Since the voltage is obtained from a series element, it is necessary to avoid high power losses in case of different, in particular, high electrical loads 3. High power losses cause an excessive heat radiation in the supply arrangement and especially in supply unit 4, which can possibly lead to loss of functionality, destruction or at least to a critical heating of supply unit 4. If a sinusoidal alternating voltage is used as operating voltage 2, two diodes connected back-to-back meaning antiparallel in general, or an NMOS power transistor with the reverse substrate diode used here can generate a voltage drop. The voltage drop can be smoothed by means of a linear voltage regulator.

Figure 22:
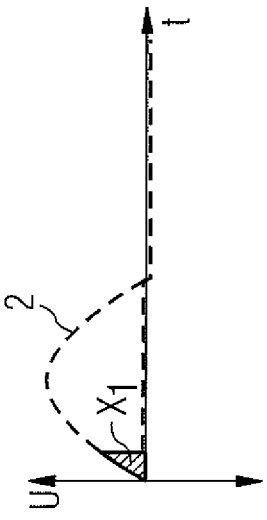
FIG. 22 shows a voltage curve over time with indicated dual phase-angle control.

A TRIAC or a transformer is used in another embodiment variant. These embodiments of a series voltage supply unit 6 are described in FIGS. 7, 10, 11 and 20. The solutions with a TRIAC or back-to-back NMOS transistors produce in principle a double-sided phase-angle control of operating voltage 2, as shown in FIG. 22. The operating voltage here is likewise a sinusoidal alternating voltage.

Figure 23:
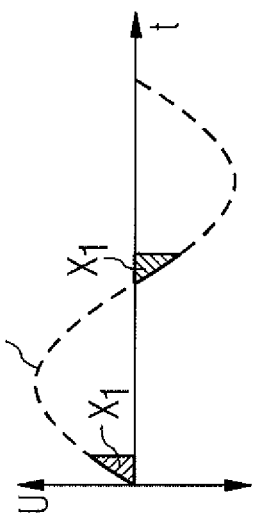
FIG. 23 shows a voltage curve over time with indicated single phase-angle control.

A TRIAC is triggered only if the sine wave voltage has risen to a few volts. Triggering is understood here to mean becoming conductive. After the triggering there remains a residual voltage and thus a power loss. The bilateral sinusoidal section X1, shown in FIG. 22, up to the triggering of the TRIAC or, in case a single NMOS power transistor is used, the unilateral phase-angle control according to FIG. 23 is led off, for example, via diodes and charged onto capacitors.

If operating voltage 2 exceeds a voltage value in the half-wave, the transistor or the TRIAC become conductive, and the voltage drop at the transistor is minimal.

Figure 7:
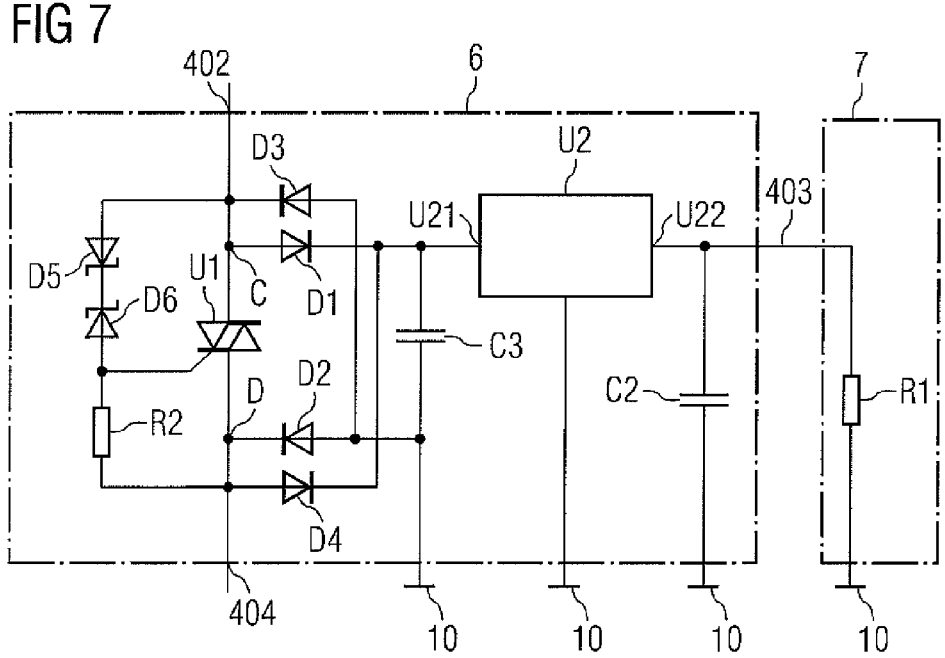
FIG. 7 shows a first embodiment of a series voltage supply unit from FIGS. 1-6.

A simple, unregulated embodiment variant of series power supply unit 6 is shown in detail in FIG. 7. Here, the aforementioned TRIAC variant is shown. Terminals 402, 403, 404 and 10 serve for orientation from the previous figure descriptions. A TRIAC U1 is arranged between input 402 of series voltage supply unit 6 and its output 404. With regard to the functioning of TRIAC U1, the reader is referred to the description of FIGS. 6 and 22.

TRIAC U1, such as a Q408L4 TRIAC, is connected in series to electrical load 3. Diodes D1-D4 conduct the voltage to a capacitor C3 connected to reference a potential 10. It will be charged by the shunted voltage. The charged voltage in C3 is additionally provided to a linear voltage regulator U2, an LT1584 for example, as an input voltage U21. From input voltage U21, this voltage regulator U2 generates a supply voltage U22 that is made available via supply voltage output 403 to an electronic unit 7. An equivalent ohmic load R1 of electronic unit 7 is symbolically coupled to supply output 403.

This embodiment has a low component cost and low production costs. Resistor R2 and diodes D5 and D6 serve here to adjust the trigger voltage of TRIAC U1.

Figure 8:
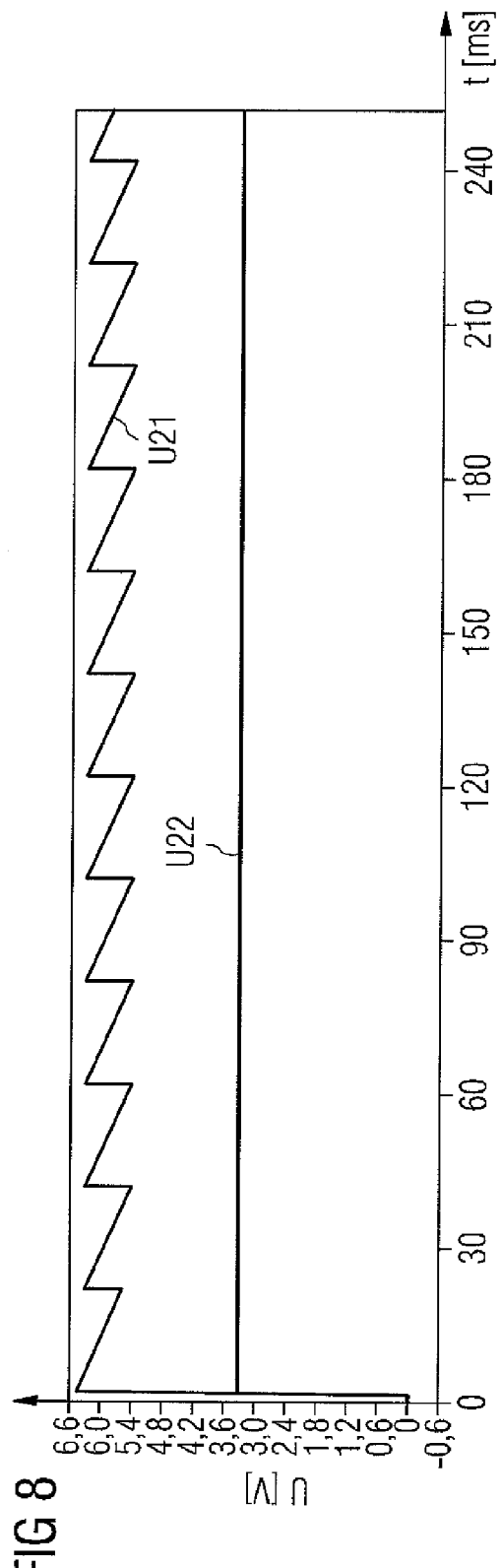
FIG. 8 shows a voltage curve over time of the input and output voltage of a downstream linear voltage regulator for voltage smoothing from FIG. 7.

The voltage curve over time of input U21 and output U22 of linear voltage regulator U2 is shown in FIG. 8. It is clearly visible that output voltage U22, which is fed as a supply voltage to electronic unit 7, is very stable and smoothed. The circuit is operated at an electrical load 3 of 1100 W at 110 V, which demands a current of 10 A. Resistor R1 has a resistance of 94 ohm.

Figure 9:
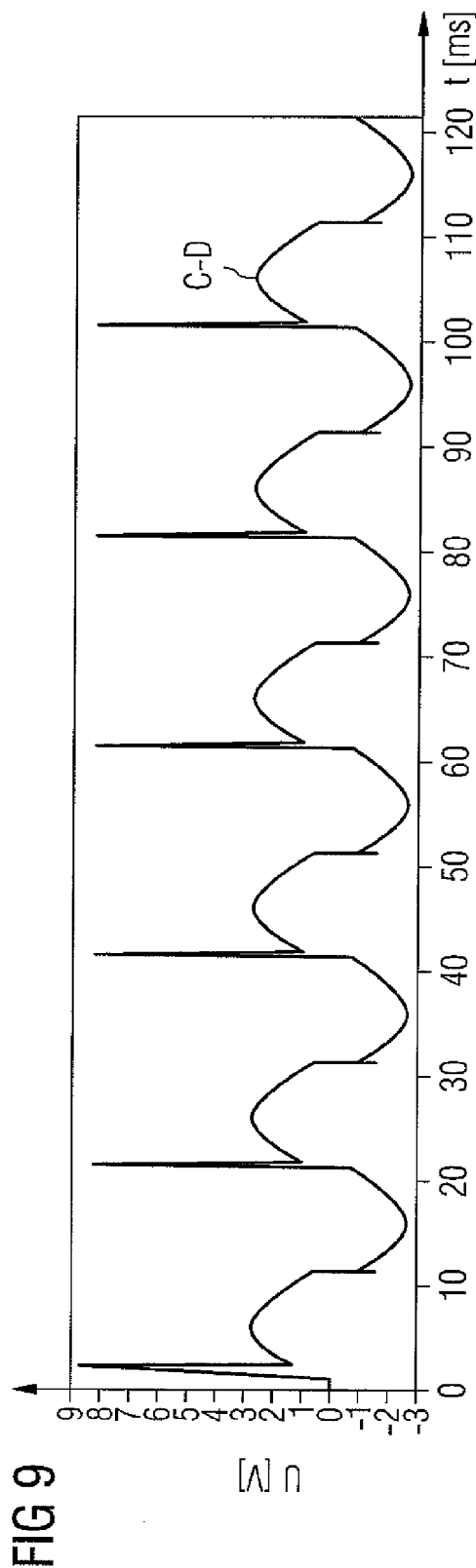
FIG. 9 shows a voltage curve over time of the voltage drop across the TRIAC from FIG. 7.

The voltage curve over time of the voltage drop of TRIAC U1 is shown in FIG. 9. The spikes in the voltage curve indicate the voltage drop of TRIAC U1, not triggered at this time. These peaks are conducted via diodes D1-D4 to capacitor C3 and charge it. Here as well, a load 3 is operated that requires a current of 10 A. Resistor R1 has a resistance of 94 ohm.

Figure 10:
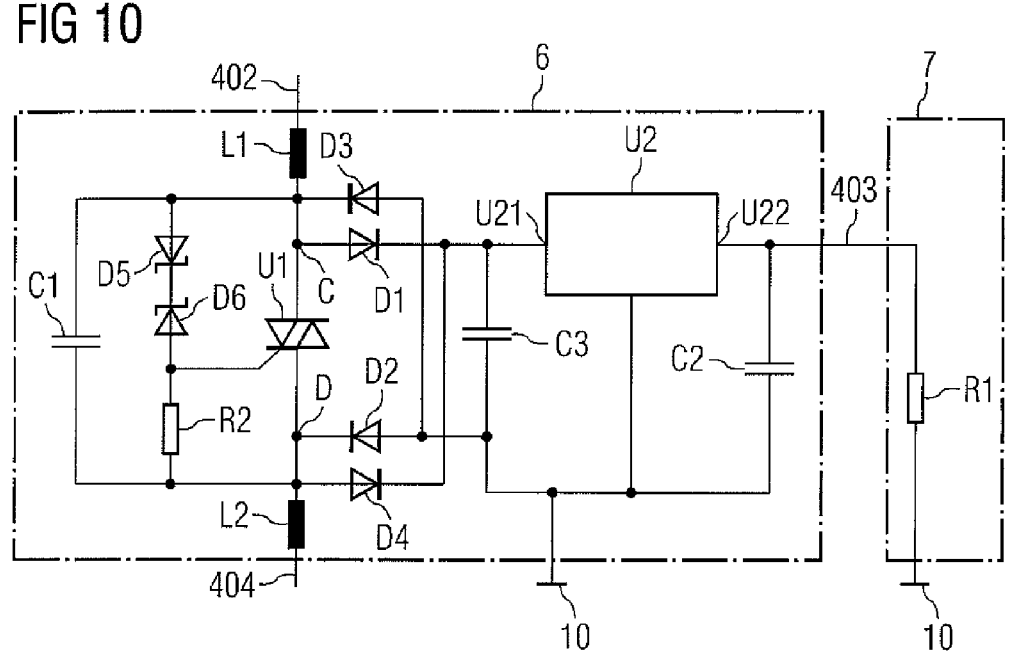
FIG. 10 shows a refinement for noise reduction of the embodiment shown in FIG. 7.

To improve the electromagnetic compatibility of the embodiment in FIG. 7, FIG. 10 shows a refinement of series power supply unit 6 shown in FIG. 7. Coils L1 and L2 and noise reduction capacitor C1 are also used here to delay the switching edges of the voltage drop of plus and minus 2 V eff for a 10 A load 3.

Figure 11:
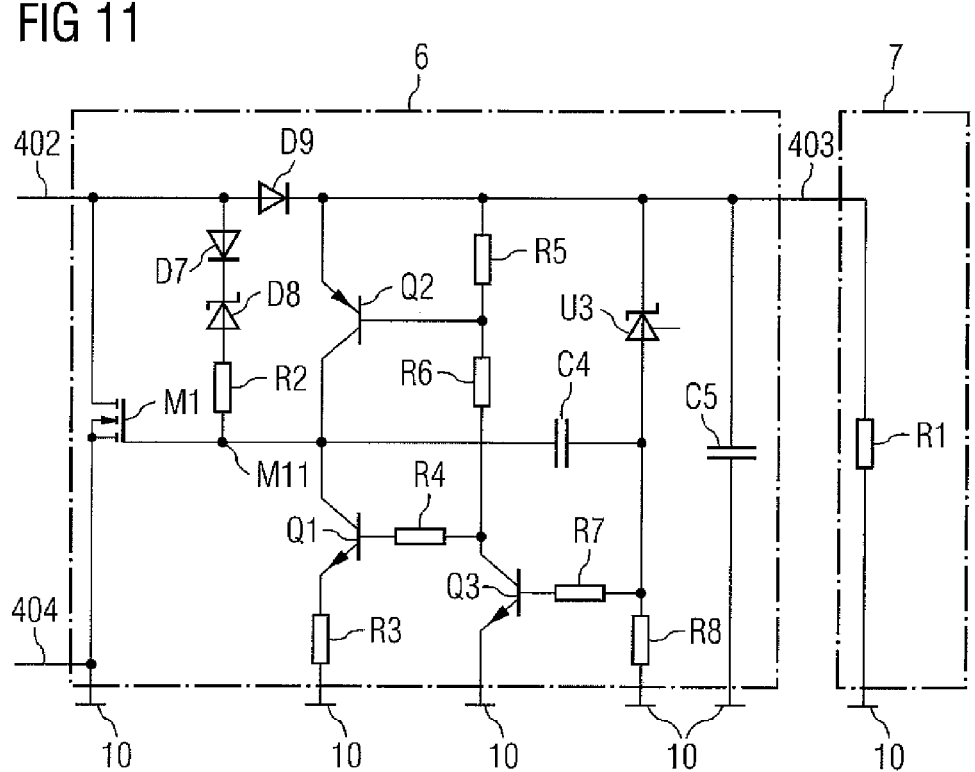
FIG. 11 shows an alternative embodiment of the series voltage supply unit shown in FIGS. 1-6, FIGS. 12-19 show voltage curves over time for different load or connection situations of the series voltage supply unit shown in FIG. 11.

FIG. 11 shows an example of an alternative embodiment of a series voltage supply unit 6. A power NMOS transistor M1 between lines 402 and 404 is used as a series element. A transistor M1 with a very low RDS-ON is used, for example, an IRF6635. Similar to the TRIAC embodiment of FIGS. 7 and 10, a phase-angle control X1 of sinusoidal operating voltage 2 is used to generate the supply voltage. Due to the internal substrate diode, transistor M1 is also in a position to process both semi-sinusoidal waves of operating voltage 2; see FIG. 23.

As long as gate M11 of power transistor M1 is positive, a low voltage drop is observed between the drain and source terminals of transistor M1. As soon as gate M11 becomes more negative, i.e., the voltage at gate M11 goes to 0 V relative to reference potential 10, the voltage at drain 402 of M1 rises sharply, i.e., the transistor turns off. Gate M11 is again raised by transistor Q2 to a positive voltage level as soon as capacitor C5 is charged. The transistor again turns on, i.e., conducts, by the positive voltage level at gate M11, and the voltage drop at drain terminal 402 is nearly 0 V. Diodes D1 and D6 preferably protect transistor M1 against over-voltage and can be omitted if desired.

Bipolar transistor Q1 again discharges gate M11 at the beginning of a new period of operating voltage 2. M1 thereby turns off and the voltage drop at drain 402 is a maximum. A maximal voltage drop is 5 V, for instance. If a higher voltage drop is generated under extreme circumstances, then a Zener diode D8 limits the voltage to 20 V for instance.

This alternative embodiment of a series voltage supply unit 6 requires few components, which are moreover economical. Fundamentally, considerably less energy is transformed into heat than, for instance, if a TRIAC, back-to-back diodes or shunt resistors are used as the series element.

Various load and connection situations will now be described by means of voltage curves over time. The varied components always corresponding to the components are labeled in FIG. 11.

Figure 12:
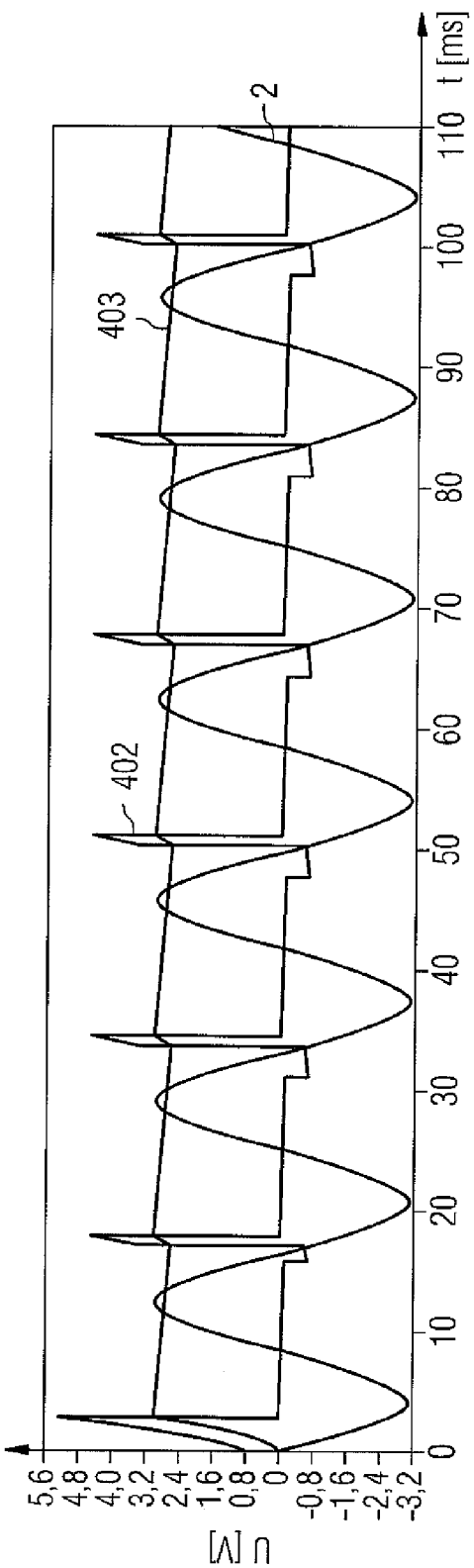

In FIG. 12, an electrical load 3 of 110 ohm is provided. The operating voltage is 110 V eff and thus produces a current of 1 A in the current loop. The resistance of R1 is 94 ohm. The voltages between drain and source 402 of transistor M1 and supply output voltage 403 at capacitor C5 as well as sinusoidal voltage 201-202 are represented. Both voltages are relative to autonomous potential 10. Also represented is the inverse operating voltage 2. The origin of the signal curves is sufficiently described in FIG. 11.

Figure 13:
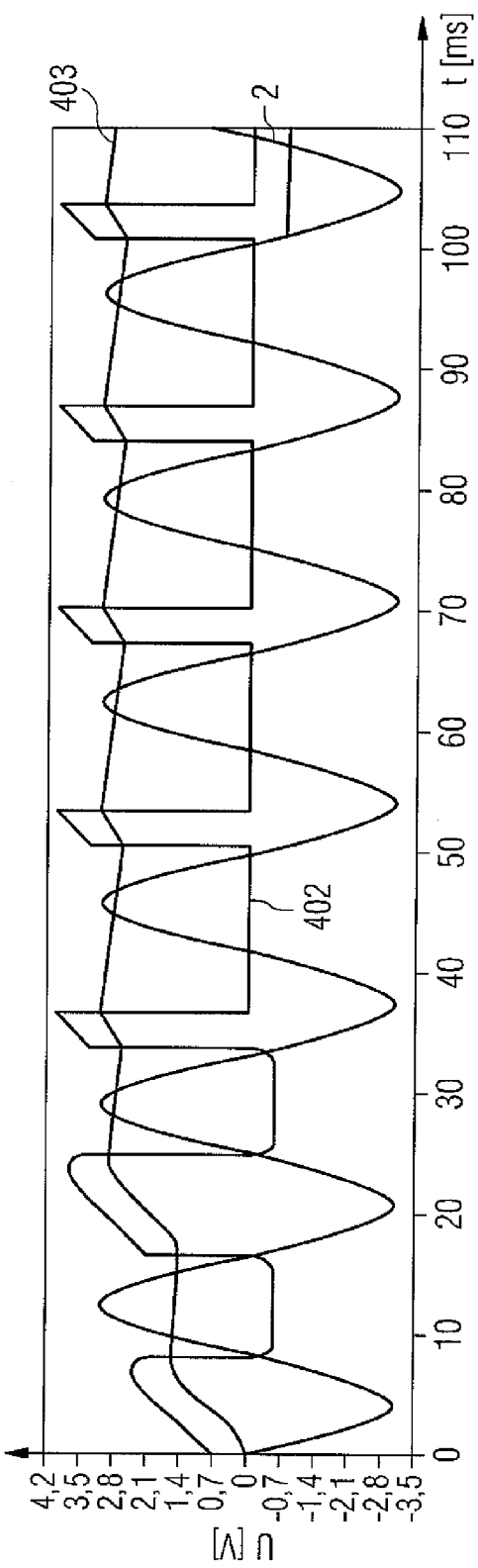

An electrical load 3 of 1100 ohm is provided in FIG. 13. This is a comparatively low load of 11 W. The operating voltage is again 110 V eff and thus produces a current of 0.1 A in the current loop. The same voltage curves 402, 403 and 2 as in FIG. 12 are represented, but with correspondingly longer turn-off times of transistor M1. It is recognizable that the maximal voltage drop at drain 402 of transistor M1 is temporally longer per period of the operating voltage. This is necessary since capacitor C5 requires a longer time to charge to the desired voltage level due to the lower load. Supply voltage 403 corresponds to the quotient of charge Q and the capacitance of C5. Since supply voltage 403 and the capacitance of C5 are to be constant, the charge for satisfying the equation must likewise be constant. Since the charge is the product of current I and time t, and the current through load 3 is low, a longer time t is required to get the same charge onto capacitor C5.

An electrical load 3 of 11 ohm is provided in FIG. 14. This is a comparatively large load of 1100 W at 110 V. The operating voltage is again 110 V eff and thus causes a current of 10 A in the current loop. The same voltage curves 402, 403, and 2 are represented as in FIG. 12. It is recognizable that the maximum voltage drop at drain 402 of M1 is temporally substantially shorter per period of the operating voltage than in FIGS. 12 and 13. Since supply voltage 403 and the capacitance of C5 are to be constant as in FIG. 13, the charge must likewise be constant. Again, since the charge is the product of current I and time t, and the current through the high load 3 is comparatively high, a shorter time t is necessary to transport the same charge into capacitor C5. The short voltage peaks of voltage curve 402 are the consequence. The power loss arises in the inductive state of the transistor and is low corresponding to RDS-ON.

An electrical load 3 of 110 ohm is provided in FIG. 15. The operating voltage is 110 V eff and thus produces a current of 1 A in the current loop. The resistance of R1 is reduced to 50 ohm. Due to this higher load of electronic unit 7, the voltage drop of the supply voltage at supply voltage output 403 is stronger during one period of operating voltage 2, for which reason capacitor C5 must be increased in comparison to FIG. 12. Moreover, a higher supply output voltage is conceivable, which can be adjusted by means of Zener diode U3. The oscillogram shows the higher load in the lengthened 402 off-phase of transistor M1.

An electrical load 3 of 110 ohm is provided in FIG. 16. The operating voltage is again 110 V eff and thus produces a current of 1 A in the current loop. The resistance of R1 is now increased to 200 ohm. Due to this lower load of electronic unit 7, the voltage drop of the supply voltage at supply voltage output 403 is lower during one period of operating voltage 2, for which reason capacitor C5 can be smaller in comparison to FIG. 12. Moreover, a lower supply output voltage is conceivable, which can again be adjusted by means of Zener diode U3. The oscillogram shows the lower load in a narrower 402 off-phase of transistor M1.

An electrical load 3 of 11 ohm is provided in FIG. 17. This is a comparatively large load of 1100 W. The operating voltage is again 110 V eff and thus produces a current of 10 A in the current loop. The resistance of R1 is 94 ohm. This corresponds to a typical load of 35 mA at a supply voltage U22 of 3.3 V. To illustrate the power loss under these extreme conditions, the section of the voltage drop between 402 and 404 at the drain of power transistor M1 and operating voltage 2 is shown enlarged. The thermal power loss is less than 2 W in this case.

The voltage curve over time at output capacitor C5 is represented in FIG. 18. To further stabilize the supply voltage, a linear voltage regulator U2 similar to that shown in FIGS. 7 and 10 is to be provided in series supply voltage unit 6. A representation of the linear voltage regulator was omitted here. Output voltage U22 of linear voltage regulator U2 is supplied at supply output 403 to an electronic unit 7. If input voltage U21 of linear voltage regulator U2 should be too low, it can be further adjusted by means of Zener diode U3.

An input voltage U21 and an output voltage U22 of a linear voltage regulator U2, not shown, is shown in FIG. 19. The additional stabilization enables a lower residual ripple of the supply voltage at supply voltage output 403.

Figure 20:
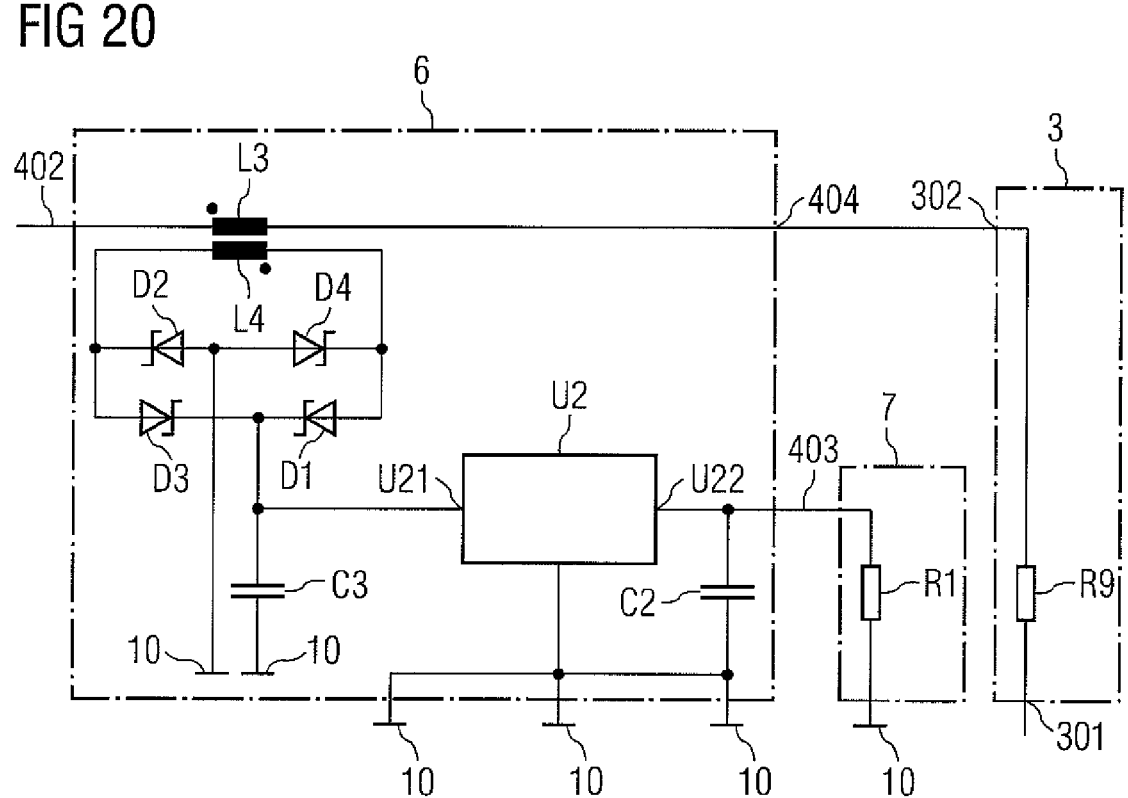
FIG. 20 shows an alternative embodiment of a series voltage supply unit from FIGS. 1-6.

An alternative embodiment of a series voltage supply unit 6 is represented in FIG. 20. Here a transformer consisting of coils L3 and L4 is used. The transformer induces a voltage across diodes D1-D4, which is in turn supplied to a linear voltage regulator U2. An additional unit 7 is again arranged at output U22 of linear voltage regulator U2. An electrical load 3 is represented by ohmic resistor R9.

Figure 21:
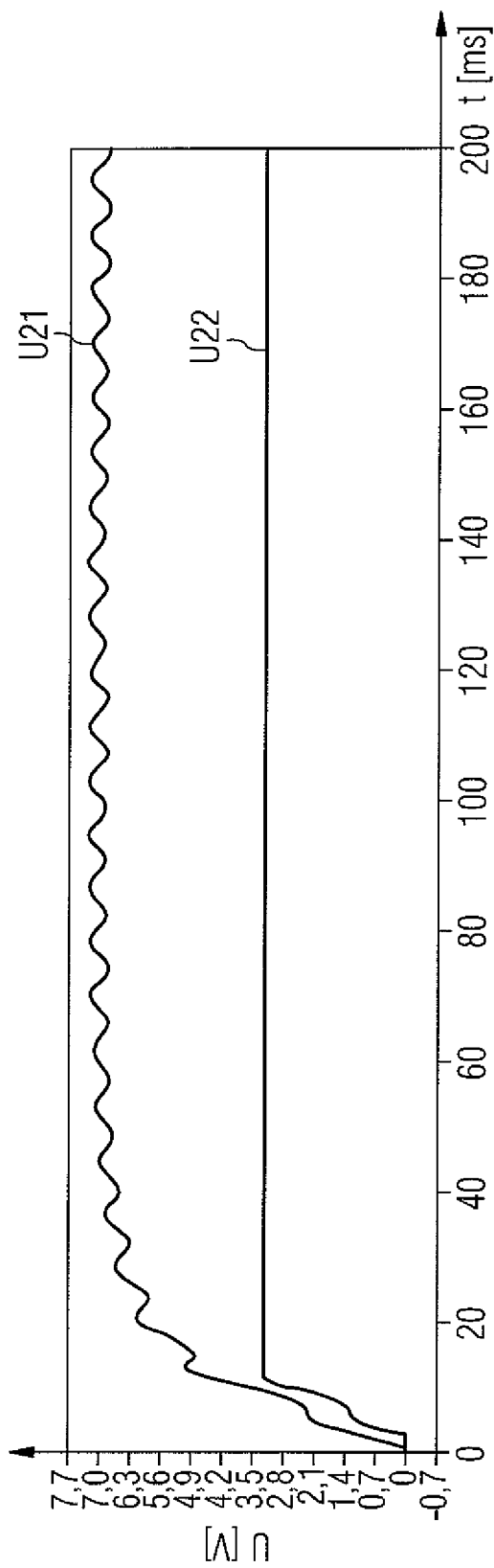
FIG. 21 shows a voltage curve over time of the input and output voltage of a linear voltage regulator from FIG. 21.

A voltage curve over time of input voltage U21 and output voltage U22 is represented in FIG. 21. The electrical load 3 here is 500 ohm. The transformer is used with a voltage ratio of 1:1. It is shown here that the transformer saturates as soon as the current through load 3 increases. A very small number of components is required in this embodiment variant.

The sinusoidal components X1 respectively used in phase-angle control are represented in FIGS. 22 and 23. One recognizes that only one half-wave of the sine wave is used if the transistor is employed as in FIG. 23.

Figure 24:
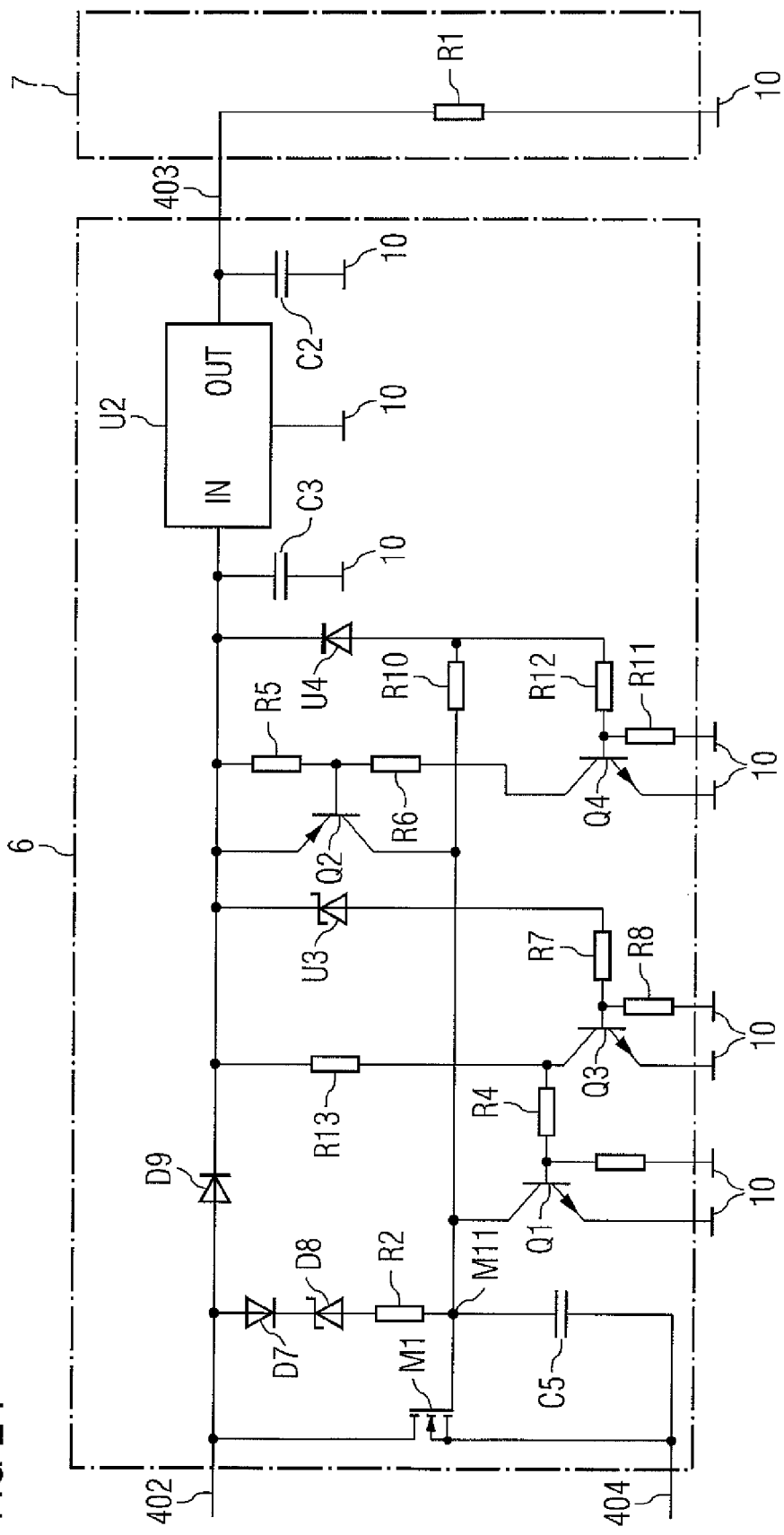
FIG. 24 shows an alternative embodiment of a series voltage supply unit from FIG. 11.

An alternative embodiment of the series voltage supply unit 6 shown in FIG. 11 is represented in FIG. 24. The differences between FIGS. 11 and 24 will now be discussed. In addition to transistors Q1-Q3, an additional bipolar transistor Q4 is inserted. The operating point of the transistor is set by means of resistors R11, R12 and by U4. R13 is added as a collector resistor for transistor Q3 and as a series base resistor for transistor Q1. The sinusoidal operating voltage 2 is applied to terminals 402 and 404. Zener diode U3 is conductive in the positive half-wave of 2; transistor Q3 is turned off, whereby transistor Q1 becomes conductive. Q1 pulls gate M11 of transistor M1 to autonomous reference potential 10. Transistor M1 is fundamentally turned off at a gate voltage of 0 V at terminal M11. The voltage between drain and source of M1 is supplied via diode D9 to linear voltage regulator U2. At output U22 of voltage regulator U2, series voltage supply unit 403 provides a supply voltage to load R1.

If the voltage level at 402 exceeds the Zener diode voltage U4, transistor Q4 becomes conductive, whereby transistor Q2 also becomes conductive. Transistor Q2 pulls gate M11 to a positive level above the threshold voltage of transistor M1. Thereby transistor M1 becomes conductive. The voltage drop between drain and source of M1 is nearly 0. M1 is likewise conductive in the negative half-wave of 2, the only voltage drop between drain and source is the voltage drop of a diode.

With this embodiment according to FIG. 24 the switching edges as well as a switching times of transistor M1 are better adjusted by Zener diodes U3 and U4. U3 and U4 have different Zener voltages, the Zener voltage of U3 in this case being 4.5 V, and the Zener voltage of U4 being approximately 6V.

Electronic unit 7 in the illustrated figures is not only provided to generate an electrical switching signal 104. It can generate or provide completely autonomous functions for elements outside the supply arrangement. It is not limited in its type and function. For instance, electronic unit 7 may be a radio receiver for using a radio switching element. By means of the received electromagnetic radiation, i.e., a radio signal, an electrical switching signal 104 is generated in additional unit 7 that changes the switching state I, II of switching element 1 or can also fulfill a dimming function.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A supply arrangement comprising:
   a switching element having at least a first and a second switching state; an operating voltage having a first and a second potential, wherein the switching element is connected by a first terminal to the second potential of the operating voltage;
   an electrical load, wherein the load is connected by a first terminal to the first potential; and
   a supply unit comprising: a first input connected to the second potential, a second input connected to a second terminal of the switching element, an output connected to a second terminal of the load, and a supply output connected to an electronic unit,
   wherein the supply unit supplies the electronic unit with power independently of the respective switching state.

2. The arrangement according to claim 1, wherein the supply unit has a parallel voltage supply unit, and the parallel voltage supply unit supplies the electronic unit with power as soon as the switching element is in the first switching state.

3. The arrangement according to claim 2, wherein the two voltage supply units are decoupled from one another by diodes.

4. The arrangement according to claim 2, wherein the parallel voltage supply unit is a stepdown converter.

5. The arrangement according to claim 1, wherein the supply unit has a series voltage supply unit, and the series voltage supply unit supplies the electronic unit with power as soon as the switching element is in the second switching state.

6. The arrangement according to claim 5, wherein the series voltage supply unit comprises at least one of shunt resistors, two back-to-back diodes, an NMOS transistor, a TRIAC, or a transformer in shunt mode.

7. The arrangement according to claim 1, wherein the supply unit generates a supply voltage and the supply voltage is relative to an autonomous potential defined in the supply unit.

8. The arrangement according to claim 1, wherein the electronic unit generates a switching signal so that the switching element is shifted at least from the first into the second switching state or from the second into the first switching state.

9. The arrangement according to claim 8, wherein the electronic unit is a radio receiver, the radio receiver receives radio signals and generates at least one switching signal that shifts the switching element at least from the first into the second switching state or from the second into the first switching state.

10. The arrangement according to claim 1, wherein the electronic unit is a regulating unit and the regulating unit regulates the second potential stepwise or continuously variably to the load.

11. The arrangement according to claim 1, wherein the electronic unit controls elements outside the supply arrangement.

12. The arrangement according to claim 11, wherein the electronic unit is a sensor, a control unit or an alarm unit.

13. A supply unit comprising: a first input connectable to a potential; a second input connectable to a terminal of a switching element; an output connectable to an electrical load; and a supply output capable of supplying an electronic unit with power, wherein a supply voltage is generated by the supply unit, and the supply voltage is relative to an autonomous reference potential inside the supply unit.

14. The supply unit according to claim 13, wherein the supply unit comprises a series voltage supply unit and a parallel voltage supply unit, and wherein the series and parallel supply units are decoupled by means of diodes.

15. The supply unit according to claim 14, wherein the parallel voltage supply unit is a stepdown converter.

16. The supply unit according to claim 14, wherein the series voltage supply unit comprises a shunt formed by two back-to-back diodes, a transistor, a TRIAC or a transformer.

17. A supply arrangement comprising:
a switching element, having at least a first and second switching state, wherein the switching element has a first and a second terminal; and
a supply unit, including a first input connectable to the first terminal of the switching element, a second input connectable to the second terminal of the switching element, an output, and a supply output connected to an electronic unit, wherein the electronic unit is supplied with power independently of the switching state of the switching element.

18. The supply arrangement according to claim 17, wherein the electronic unit generates a switching signal so that the switching element is shifted at least from the first into the second switching state or from the second into the first switching state.

19. The supply arrangement according to claim 17, wherein the electronic unit is a radio receiver and/or a regulating unit.

20. The supply arrangement according to claim 17, wherein the supply unit has a series voltage supply unit and a parallel voltage supply unit, and wherein the series and parallel voltage supply units are decoupled by means of diodes.

21. The supply arrangement according to claim 20, wherein the parallel voltage supply unit is a stepdown converter.

22. The supply arrangement according to claim 20, wherein the series voltage supply unit is realized by means of a shunt resistor, two back-to-back diodes, a transistor, a TRIAC or a transformer.

23. A method for supplying an electronic unit with power, comprising the steps of:
arranging in series a supply arrangement according to claim 17 and an electrical load,
applying an operating voltage having a first and a second potential to the series circuit, and
generating the supply voltage with an autonomous reference potential in the supply unit independently of the switching state of the switching element.

24. The method according to claim 23, wherein the electronic unit generates a switching signal so that the switching states of the switching element are changed.

25. The method according to claim 24, wherein the electronic unit is a radio receiver, the radio receiver receives radio signals and generates switching signals for changing the switching states.

26. The method according to claim 24, wherein the electronic unit is a regulating unit and the regulating unit regulates the second potential stepwise or continuously variably to the load.

* * * * *